T. A. C. BOTH.
MECHANICAL MOVEMENT.
APPLICATION FILED JAN. 5, 1911.
994,713.
Patented June 13, 1911.
3 SHEETS—SHEET 1.
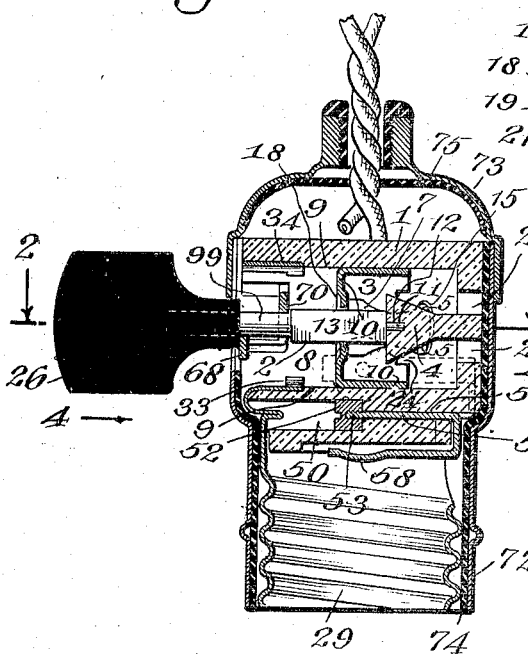
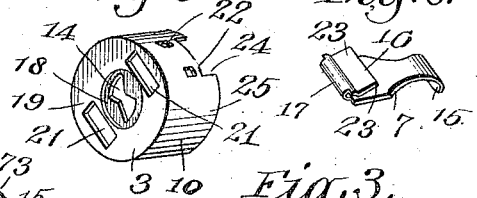
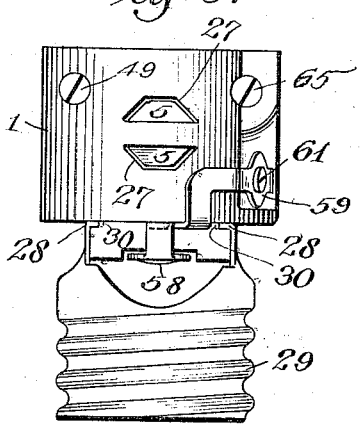
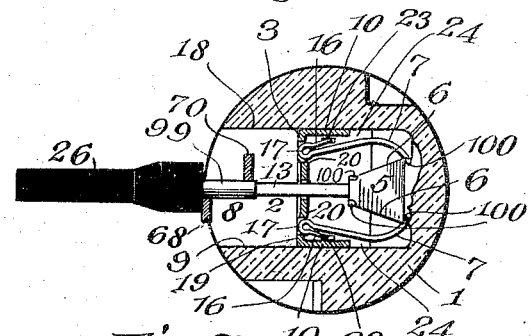
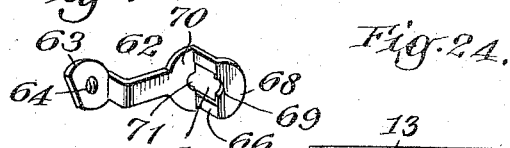
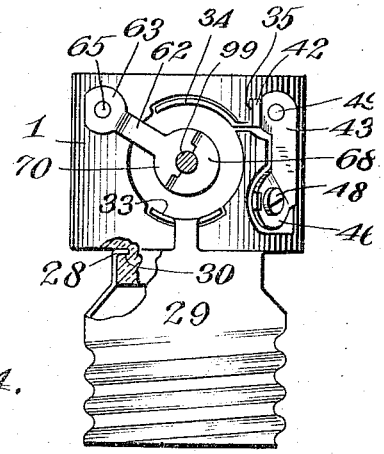
WITNESSES
INVENTOR
Tonjes A. C. Both
BY
Alan M. Johnson
ATTORNEY

T. A. C. BOTH.
MECHANICAL MOVEMENT.
APPLICATION FILED JAN. 5, 1911.

994,713.

Patented June 13, 19

3 SHEETS—SHEET 2.

WITNESSES

INVENTOR
Tonjedt C. Both
BY
ATTORNEY

T. A. C. BOTH.
MECHANICAL MOVEMENT.
APPLICATION FILED JAN. 5, 1911.
994,713.
Patented June 13, 1911.
3 SHEETS—SHEET 3.
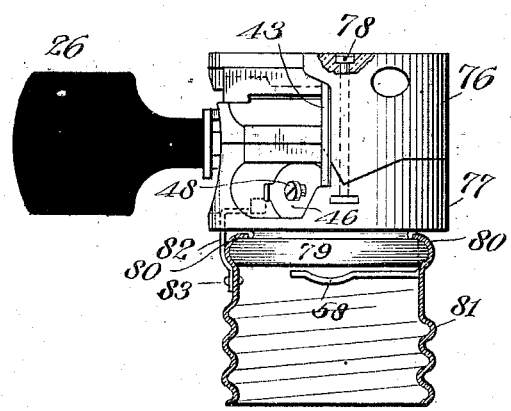
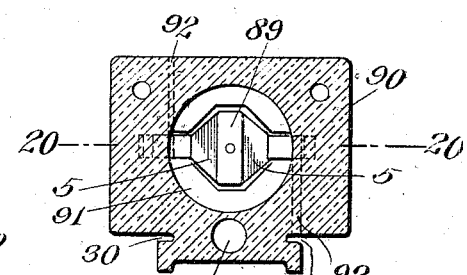
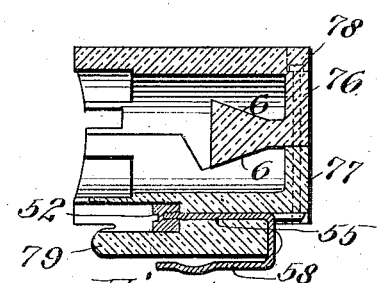
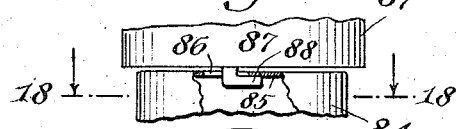
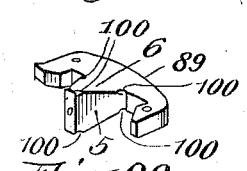
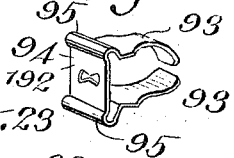
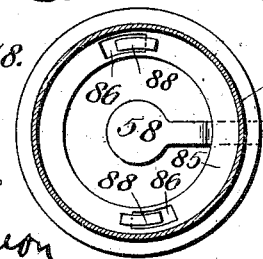
WITNESSES
INVENTOR
Torges A. C. Both
BY
Alan M. Johnson
ATTORNEY

UNITED STATES PATENT OFFICE.

TONJES AUGUST CARL BOTH, OF NEW YORK, N. Y., ASSIGNOR TO IDA S. ROSENHEIM, OF NEW YORK, N. Y.

MECHANICAL MOVEMENT.

994,713.  Specification of Letters Patent.  Patented June 13, 1911.

Application filed January 5, 1911. Serial No. 600,929.

*To all whom it may concern:*

Be it known that I, TONJES AUGUST CARL BOTH, a citizen of the United States, and a resident of New York, in the county of New York and State of New York, have invented new and useful Improvements in Mechanical Movements, of which the following is a specification, taken in connection with the accompanying drawings, which form a part of the same.

This invention relates to mechanical movements adapted for universal application and is an improvement upon U. S. Patent No. 943,274, patented December 14, 1909.

More particularly it relates to a mechanical movement which will, as will said former patent, make a quick make as well as a quick break when used as the operating mechanism of an electric switch, though of course, it is to be understood that my present invention is not to be limited to such use.

My invention further relates to electric light sockets and to details of construction as will be more fully hereinafter pointed out and set forth in the claims.

Figure 8:
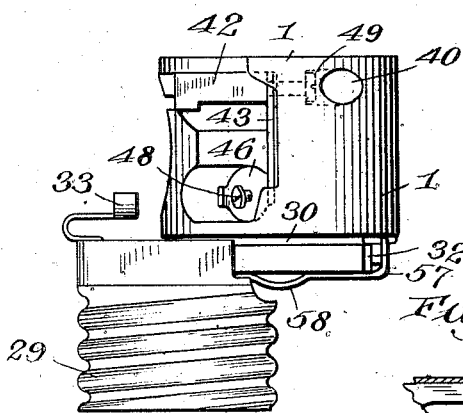
Figure 10:
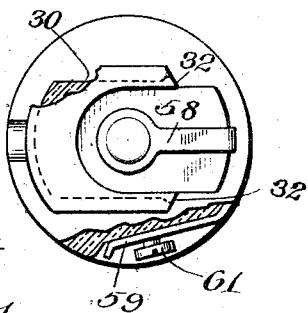
Figure 9:
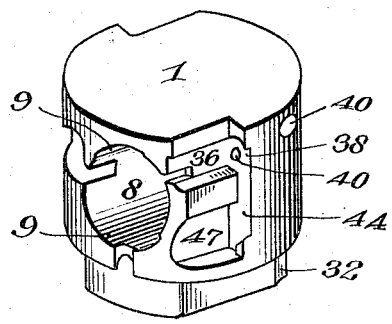
Figure 11:
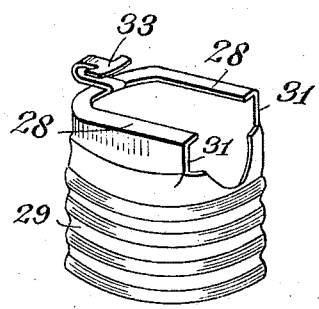
Figure 12:
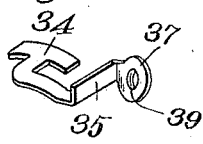
Figure 13:
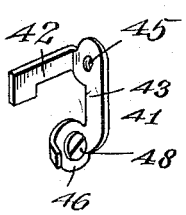
Figure 14:
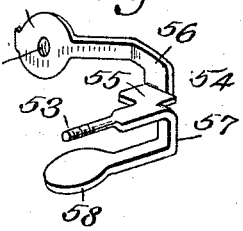

In the accompanying drawings showing illustrative embodiments of my invention and in which the same reference numerals refer to similar parts in the several figures,—Figure 1 is a central vertical section through my improved electric light socket equipped with my mechanical movement; Fig. 2 is a transverse horizontal section substantially on the line 2, 2 of Fig. 1, the handle or button of the driving member being shown in plan; Fig. 3 is a side elevation of the electric light socket with the casing and cap omitted, looking in the direction of the arrow numbered 3; Fig. 4 is an elevation, partly broken away for purposes of illustration, of the electric light socket, looking in the direction of the arrow numbered 4, with the omission of the casing and cap; Fig. 5 is a detail perspective view of the driven member; Fig. 6 is a detail perspective view of one of the spring arms carried by the driven member; Fig. 7 is a detail perspective view of the detachable bearing for the driving member or arbor; Fig. 8 is a side elevation of the electric light socket showing the screw shell in the act of being assembled; Fig. 9 is a detail perspective view of the fixed member of the mechanical movement which is also, when the device is used with an electric light socket, the insulating base of the socket; Fig. 10 is a bottom view, partly broken away, for purposes of illustration, of the fixed member or insulating base; Fig. 11 is a detail perspective view of the preferred form of screw shell; Fig. 12 is a detail perspective view of one of the contacts; Fig. 13 is a detail perspective view of one of the binding plates; Fig. 14 is a detail perspective view of the center contact plate; Fig. 15 is a side elevation, partly in section and partly broken away, of a modification in which the fixed member or insulating base is formed in two parts and the screw shell is crimped or bent over a dependent flange or boss on the lower of the two parts of the fixed or insulating member; Fig. 16 is a detail vertical section of the modification shown in Fig. 15 showing the manner of mounting the inclined surfaces on one of the two parts of the fixed member, it being understood that by the term "fixed member" it is meant the fixed member of the mechanical movement which, in the device as illustrated, is also the insulating base of the electric light socket; Fig. 17 is a fragmentary side elevation, partly broken away, and partly in section, showing a bayonet slot connection between the fixed member or insulating base of the electric light socket and the screw shell; Fig. 18 is a horizontal section substantially on the line 18, 18 of Fig. 17, looking up in the direction of the arrows; Fig. 19 is a vertical section through a fixed member showing a modification wherein the oppositely inclined surfaces are on a separate member which is secured to the fixed member or insulating base and becomes practically a part thereof; Fig. 20 is a horizontal section substantially on the line 20—20 of Fig. 19; Fig. 21 is a detail perspective view of the separate element on which are mounted the oppositely inclined surfaces and which is secured in the recess in the insulating base or fixed member shown in Figs. 19 and 20; Fig. 22 is a detail perspective view showing a modified form of driven member wherein the springs are formed integral with it; Fig. 23 is a detail perspective view of another modification in which the spring members are also integral with the driven member; Fig. 24 is a plan view of the driving member or arbor with the omission of the button or handle; and Fig. 25 is a detail fragmentary plan view showing the manner of pressing or crimping the edges 31, 31 of the screw shell to the insulating base.

In the illustrative embodiments of my mechanical movement (which I have shown as the operating mechanism of an electric light socket) 1 is the fixed member of my mechanical movement, 2 the driving member, 3 the driven member and 4 an arm upon which I arrange oppositely inclined surfaces 5 and 6 upon which operate the spring members 7, 7 carried by the driven member 3. The fixed member 1 is provided with a recess 8, the walls 9, 9 of which act as a guide for the flange 10 of the driven member 3. The arm 4 upon which the oppositely inclined surfaces 5 and 6 are mounted is fast to the fixed member 1 and is preferably, though not necessarily, formed integral with it, as shown in Fig. 1, though this arm may be formed as a separate element and secured to the fixed member as shown for example in Figs. 19, 20 and 21, which will be hereinafter described in detail.

I mount the driving member or arbor 2 in any suitable manner within the fixed member 1. An efficient manner of mounting it which I have found in practice is to form a reduced portion 11 on the axle or arbor 2 and form a complementary aperture or opening 12 in the arm 4 to receive the reduced portion 11. The axle or arbor 2 is formed non-circular in cross-section as for example by providing it with a flattened portion 13 which passes through and coöperates with a non-circular opening 14 in the driven member 3.

The spring members 7, 7 or equivalents, may be secured to the driven member 3 in any suitable manner. For example the spring arms may be formed integral with the driven member, as shown in Figs. 22 and 23 to be hereinafter described in detail, or the spring members may be separate as shown at 7 in Fig. 6, where they comprise substantially a piece of spring metal bent back upon itself forming an engaging arm 15 to engage with the fixed oppositely inclined surfaces 5 and 6, the other end 16 of the member 7 being bent back upon itself to form a shoulder 17. When the form of spring arm 7 is used I preferably form a depression 18 in the face 19 of the driven member 3 by stamping or pressing this portion of the metal inward to form supporting shelves 20, 20, Fig. 2, upon which rests the shoulders 17, 17 of the spring arms 7, 7. At the same time I also preferably form in the face 19 of the driven member 3 rectangular slots 21, 21 to partly receive the shoulders 17, 17. In the flange 10 of the driven member 3 I preferably form a plurality of notches or holes 22, 22 arranged in pairs, to receive the angular ends 23, 23 of the end 16 of the spring arm 7, Fig. 2. The flanges 10 are also preferably notched or cut away at 24 so as to permit the spring arms to move outwardly without being limited in their play by the edge 25 of the flange 10. When the shoulders 17, 17 and the spring arms 7, 7 are mounted upon the shelves 20, 20 and the angular ends 23, 23 coöperate with the notches 22, 22 this form of driven member 3 is in condition to have the free arms 15 of the members 7, 7 sprung over the inclined surfaces 5 and 6. When the fixed member 1 with its inclined surfaces 5 and 6 and the driving member 2 and driven member 3 are properly assembled, as shown for example in Fig. 1, it is obvious that upon a partial rotation of the driven member 3 by partially rotating the button or handle 26 this movement will also cause a partial revolution of the driven member 3 due to the fact that the flattened portion 13 of the driven member passes through the non-circular portion 14 of the driven member 3. This partial rotation of the driven member 3, with its spring arms 7, 7 will cause the free arms 15, 15 of the members 7, 7 to move from a valley or low portion of one of the inclined surfaces 5 or 6, to the hill or larger portion of the next inclined surface, which movement will cause the free arms 15, 15 to be spread which will store up energy in the arms 7, 7 until the partial revolution of the driven member 3 is completed, when this stored-up energy will be utilized by the arms 15, 15 moving down one or the other of the incline surfaces 5 or 6 passing from a hill to a valley. In making this movement, however, they will necessarily cause the driven member 3 to move laterally upon the driving member 2 to the left or right of the position shown in Fig. 1, as the case may be; the direction of movement being alternate with each successive partial revolution of the driving member 2. This will cause the driven member 3 to move with a sharp, quick snap in both directions successively, the driven member being guided upon the walls 9, 9 of the fixed member 1 of the mechanical movement on which is immovably mounted the oppositely inclined surfaces 5 and 6, it of course being understood that these surfaces do not rotate or move. While I preferably use two spring arms 7 and pairs of oppositely inclined surfaces, it is to be understood that my invention will operate with only one spring arm 7 and with simply two oppositely inclined surfaces. This alternate quick movement or snap of the driven member 3 may be utilized for various purposes. For purposes of illustration I have shown it as the operating mechanism in an electric light socket in which the fixed member 1 becomes the insulating base of the electric light socket, though it is to be distinctly understood that while I preferably make the fixed member 1, or insulating base, of one piece of material, it may be formed of a plurality of parts such as shown in Fig. 15, to be hereinafter described, and instead of the oppositely inclined surfaces being formed integral with the fixed member 1 they may be on a separate member which is secured to the insulating base or fixed member as shown for example in Figs. 19, 20 and 21 to be also hereinafter described.

In the preferred form of the fixed member 1 when it is used as the insulating base for an electric light socket, the entire base 1 is formed out of porcelain or some other similar insulating material, the oppositely inclined surfaces 5 and 6 being preferably, though not necessarily, formed upon an integral arm 4 which can be readily molded or shaped by the proper tools passing through the apertures 27, 27, Figs. 1 and 3, without forming any cross-holes, which cross-holes would increase the cost of manufacturing the fixed member or insulating base.

My invention also includes a cheap, simple and economical manner of securing the side contact for an electric light socket, which is usually in the form of a screw shell, to the insulating base or receptacle of the socket, whether that insulating base is formed of one or more parts, without the aid of screws, rivets, or other similar members to hold the screw shell to the insulating base.

I have found in practice that a cheap and economical way of manufacturing an electric light socket is to form coöperating engaging surfaces 28 upon the shell or side contact 29 and form coöperating engaging surfaces 30, Figs. 8 and 10, upon the insulating base or receptacle 1. These engaging surfaces may take the form as I have shown of flanges and grooves. Simply for purposes of illustration I have shown the engaging surfaces or flanges 28, 28 upon the side or screw shell contact 29, Figs. 3 and 11, and so arranged that they can readily slip in the recesses or grooves 30 mounted on the insulating base or receptacle 1. But it is to be distinctly understood that this arrangement of flanges and recesses may be reversed, if desired, the form shown being merely illustrative. My invention as applied to an electric light socket, however, covers broadly any such coöperating engaging surfaces which will securely hold the shell contact to the insulating base without screws, rivets, pins, or other similar securing mechanism. After the flanges 28, 28 with their screw shell 29 have been properly seated, the edges 31, 31 of the screw shell contact 29 may be bent in to engage with the cut away portions 32, 32, Fig. 25, so as to prevent the flanges 28, 28 from slipping out of the grooves 30, 30. This bending in of the edges 31, 31 may, however, be omitted.

On the screw shell contact 29 I mount in any suitable manner a contact 33 either by forming it integral with the screw shell contact as shown for example in Fig. 1, or mounting it in any other suitable manner so that it will bend back upon itself, and when the screw shell is assembled with the fixed insulating base 1 this contact 33 will rest upon what may be termed the floor or lower portion of the aperture 8 formed in the fixed insulating member 1, Fig. 1. Opposite this contact 33 and resting on the upper portion of the recess 8 is mounted the coöperating contact 34. This contact is shown in detail in Fig. 12 and includes a bent arm 35 which fits snugly in the side recess 36 of the fixed insulating member 1, the bent apertured foot 37 fitting snugly against the cut away portion 38 so that the screw threaded aperture 39 will register with the aperture 40 in the insulating base 1. Coöperating with a portion of this contact 34 is the binding plate 41, Fig. 13, having an arm 42 which overlaps the bent portion 35 of the contact 34 and an angular member 43 which fits snugly in the cut away portion 44, the screw threaded aperture 45 of which also registers with the aperture 40 in the insulating base 1 and with the screw threaded aperture 39 in the contact 34. The lower end 46 fits snugly in the cut away portion 47, Fig. 9, of the insulating base 1, and in this lower end 46 is the binding screw 48 to which is secured one end of one of the feed wires. A screw 49 shown in dotted lines in Fig. 8 and in full lines in Fig. 3, is passed through the aperture 40 in said Fig. 8 and the screw threaded end serves to engage and coöperate with the screw threaded portions 45 and 39 of the binding plate 41 and contact 34, respectively, and securely hold them in their proper position on the insulating base 1.

In the lower portion of the insulating base or receptacle 1, I form a transverse aperture preferably, though not necessarily, of two diameters 50 and 51. In the larger aperture 50 is mounted a nut 52 to coöperate with the screw threaded end 53 of the center contact plate 54, Figs. 1 and 14. This center contact 54 is of peculiar contour. It consists essentially of the body member 55 having upwardly and downwardly extending arms 56 and 57, respectively, the lower arm being bent back upon itself and preferably enlarged to form the center contact 58 of the electric light socket. The upper arm 56 is bent at an angle to itself and preferably enlarged to form a binding plate 59, and is provided with a screw thread 60 for the reception of the binding screw 61, Fig. 3, to which one of the feed wires is connected. The body member 55, together with the screw threaded portion 53, is inserted within the aperture 51 in the lower portion of the insulating base 1, the arrangement being such that a portion of the screw threaded end 53 will extend into the larger aperture 50 so as to permit the nut 52 to engage with it and securely hold the entire center contact plate 54 with its center contact 58 and its binding plate 59 to the insulating receptacle 1 by means of the nut 52, Fig. 1.

Another portion of my invention is the new and useful bearing 62, Figs. 7, 1 and 2, for the driving member 2. This bearing comprises a body member 70 having a bent foot 63 provided with a screw threaded aperture 64 to coöperate with the screw 65, Figs. 3 and 4, which is mounted in a recess in the insulating base or fixed member 1, the head of the screw being shown in Fig. 3 and its end being shown in Fig. 4 in engagement with the foot of the bearing 62. The other end of the body member 70 is provided with an offset portion 66 which is apertured at 67 so as to permit the ready insertion of the axle, arbor, or driving member 2. The end of the offset portion 66 is then bent down at right angles forming a stop 68 for a purpose to be hereinafter described. The upper part of the stop 68 is cut away to form a bearing or seat 69 for the axle or arbor 2, the body member 70 is also recessed at 71 to form a bearing similar to the other just described, but staggered with relation thereto. In assembling the parts I preferably pass the axle or arbor 2 through the slot 67 and then bring them into operative position within the insulating base 1, the foot 63 being held from movement by means of the screw 65 as previously described. When this bearing 62 is thus assembled it not only forms a bearing for the driving member 2 but the body member 70 of the bearing acts as a stop to the outward movement of the driven member 3 and the member 68 also acts as a stop to the inward movement of the button or handle 26 of the driving member 2 so that this bearing 62 performs several functions.

For purposes of illustration I have shown my electric light socket surrounded by a casing 72 and a cap 73, the former being lined with any suitable insulation 74 and the latter with a similar insulation 75. It is to be distinctly understood, however, that my invention does not embody this casing or cap and I have, therefore, to more readily illustrate my invention, omitted them in the other figures of the drawing. Such casings and caps may or may not be used, as may be found convenient or expedient, though usually they are employed.

In this form of my invention a partial revolution of the driving member 2 will cause the driven member 3 to also partially rotate with it, which will spread the free arms 15 of the spring arms 7, causing them to pass from a valley to a hill on the oppositely inclined surfaces 5 and 6. This will cause energy to be stored up in the spring arms and they will then move down from a hill to a valley on the incline surfaces 5 and 6, which it is understood are always fixed or fast. As these spring members 7 are carried by the driven member 3 it necessarily follows that this driven member will be caused to move back and forth on the driving member 2 alternately, and consequently as this member 3 is formed of some metallic conducting material it will alternately make and break the electrical connection between the contacts 34 and 33 with a quick, sharp snap which will prevent arcing of the parts and in this manner the lamp secured to the screw shell or side contact 29, or any other consuming device, will be alternately energized.

In some cases instead of forming the fixed member 1 as a single insulating member I form it of a plurality of parts such for example as the parts 76 and 77, as illustrated in Figs. 15 and 16, the two parts being connected together by means of screws 78, or other fastening means. In this construction the oppositely inclined surfaces 5 and 6 will be formed preferably on one or the other of the members 76 and 77. For purposes of illustration I have shown the oppositely inclined surfaces formed upon the member 76. In some instances also I may form a depending flange 79, Fig. 15, on the lower member 77 and crimp, swage or otherwise press the upper end 80 of the screw shell contact 81 over the flange 79, thereby avoiding the use of screws, rivets, pins, or other similar securing means to hold the screw shell or side contact to the insulating base. In this construction I have shown the contact 82 riveted by means of rivets 83 to the screw shell contact 81, it being understood that it performs the same function that the contact 33 does in the construction illustrated in Fig. 1.

Instead of using flanges such as 28, 28 in Fig. 1 or crimping the upper edge of the screw shell contact to the insulating base, I may in some cases form the screw shell contact 84, Fig. 17, with an annular inturned ring 85 in which I form one or more slots 86. On the lower portion of the insulating receptacle 87, Fig. 17, I may mount in any suitable manner angular lugs 88 which are adapted to pass through the slots 86, 86 in the ring 85 and engage beneath this ring when the screw contact 84 and the insulating base 87 are given a relative rotation with relation to each other, thereby forming, in effect, a bayonet slot connection between the screw shell 84 and the insulating base 87, it of course being understood that the arrangement of slots and lugs may be reversed without departing from my invention.

While I preferably form the oppositely inclined surfaces 5 and 6 integral with the fixed member 1 of my mechanical movement, or if this member 1 is used as the insulating base of an electric light socket, then I preferably form the oppositely inclined surfaces integral with the same material that the insulating base is formed of. I may in some instances form these oppositely inclined surfaces upon a separate member 89, Fig. 21, and mount this member within the fixed member 90, Figs. 19 and 20, which as here illustrated is preferably, though not necessarily, formed of a single member. This member 89 is so mounted in the fixed or insulating member 90 as to permit the oppositely inclined surfaces 5 and 6 to extend into the aperture or opening 91 in the fixed member 90, the member 89 being held in proper position by any suitable means such for example as by means of the pins 92, 92, Figs. 19 and 20.

In some cases it is desirable to form the spring members or arms 7 integral with the driven member. In Fig. 22 I have shown a driven member 192 having integral spring arms 93, 93 which are adapted to contact directly with the oppositely inclined surfaces 5 and 6. The body member 94 of this form of driven member serves to make the electrical connection between the contacts 33 and 34. To form a stronger spring I preferably form the crimps 95, 95 in the integral spring arms 93, 93.

I may vary the contour of the driven member by forming it for example out of a single integral stamping or sheet of material forming a driven member 96, Fig. 23, having a cupped shaped member 97 to which are connected integral spring arms 98, 98.

The driving member 2 is preferably formed from a punched strip of flat metal, Fig. 24, its ends 11 and 99 being rounded by swaging or otherwise forming them so that the end 11 will coöperate with its seat 12 in the arm 4, while the rounded portion 99 will coöperate with the cut away recesses 69 and 71 in the bearing 62, Fig. 7. This driven member 2 may therefore be formed out of a continuous strip of flat material cut to the proper length, and swaged, pressed or otherwise worked to form the bearings 11 and 99 as previously described.

While I preferably form the driven member 2 in the manner previously described, it is to be understood of course that it may be formed in any suitable manner whether from flat stock or not.

I also preferably employ retarding notches 100, 100 on the angular edges of the oppositely inclined surfaces 5 and 6 which serve to hold the spring arms 7, 93 or 98, as the case may be, from moving down the inclined surfaces 5 and 6 until the partial revolution of the driving and driven member is completed. These notches are more clearly illustrated in Fig. 21.

Having thus described this invention in connection with several illustrative embodiments thereof to the details of which I do not desire to be limited, what is claimed as new and what it is desired to secure by Letters Patent is set forth in the appended claims:

1. In a mechanical movement the combination of a fixed member provided with oppositely inclined surfaces, a driving member and a driven member, the latter provided with means to coöperate with the oppositely inclined surfaces of the fixed member, and means between the driving and driven members to cause them to rotate together, but permitting relative lateral movement with relation to each other.

2. In a mechanical movement the combination of a fixed member provided with oppositely inclined surfaces, a driving member and a driven member, means between the driving and driven members to cause them to rotate together but permitting relative lateral movement with relation to each other, and spring means carried by the driven member to coöperate with the oppositely inclined surfaces of the fixed member.

3. In a mechanical movement the combination of a fixed member provided with an arm having oppositely inclined surfaces, a driving member and a driven member, means between the driving and driven members to cause them to rotate together but permitting relative lateral movement with relation to each other, and means carried by the driven member to coöperate with the oppositely inclined surfaces of the fixed member.

4. In a mechanical movement the combination of a hollow fixed member provided with an arm extending into the hollow portion of the fixed member and having oppositely inclined surfaces, a driving member and a driven member, means between the driving and driven members to cause them to rotate together but permitting relative lateral movement with relation to each other, and means carried by the driven member to coöperate with the oppositely inclined surfaces of the fixed member.

5. In a mechanical movement the combination of a fixed member formed of one or more parts and provided with an aperture, oppositely inclined surfaces carried by the fixed member, a driving member mounted in the fixed member, a driven member also mounted in the fixed member, means between the driving and driven members to cause them to rotate together but permitting relative lateral movement with relation to each other, and means carried by the driven member to coöperate with the inclined surfaces of the fixed member.

6. In a mechanical movement the combination of a one piece fixed member provided with an aperture, oppositely inclined surfaces carried by the fixed member, a driving member mounted in the fixed member, a driven member also mounted in the fixed member, means between the driving and driven members to cause them to rotate together but permitting relative lateral movement with relation to each other, and means carried by the driven member to coöperate with the inclined surfaces of the fixed member.

7. In a mechanical movement the combination of a fixed inclosing member formed of one or more parts and provided with oppositely inclined surfaces, a driving member mounted within the fixed member, a driven member mounted on the driving member, means between the driving and driven members to cause them to rotate together but permitting relative lateral movement with relation to each other, and means carried by the driven member to coöperate with the fixed oppositely inclined surfaces of the fixed member.

8. In a mechanical movement the combination of a fixed member provided with oppositely inclined surfaces and with an aperture, a driving member mounted within the aperture of the fixed member, a driven member also mounted within the aperture of the fixed member and adapted to be guided by the walls of said aperture, means between the driving and driven members to cause them to rotate together, but permitting relative lateral movement with relation to each other, and means carried by the driven member adapted to coöperate with the fixed inclined surfaces carried by the fixed member.

9. An article of manufacture for a mechanical movement comprising a cupped shaped driven member provided with a plurality of recesses and one or more spring arms carried by the driven member, each spring arm coöperating with a plurality of recesses in the driven member so as to hold it to said member.

10. An article of manufacture for a mechanical movement comprising a bearing having means to secure it to its support and provided with a plurality of stops arranged staggered with relation to each other.

11. An article of manufacture for a mechanical movement comprising a bearing having a foot and a body member, and a slotted arm arranged at an angle to the body member, the end of the arm being bent at right angles to itself forming a stop, the body member forming another stop and arranged staggered with relation to the first stop.

12. An article of manufacture for a mechanical movement comprising a cupped shaped driven member provided with a plurality of apertures and with one or more shelves, one for each spring arm, one or more spring arms carried by the driven member, a portion of each spring arm resting upon a shelf of the driven member, the end of each spring arm coöperating with apertures in the driven member to hold it on its shelf.

13. A mechanical movement comprising a fixed member formed of one or more parts and provided with fixed oppositely inclined surfaces and with an opening or aperture, a driving member mounted within the opening or aperture of the fixed member, a driven member also mounted within the opening or aperture and guided by the walls of said aperture, means between the driving and driven members to cause them to rotate together, but permitting relative lateral movement with relation to each other, and spring means carried by the driven member to coöperate with the fixed oppositely inclined surfaces of the fixed member.

14. A mechanical movement comprising a fixed member formed of one or more parts and provided with fixed oppositely inclined surfaces and with an opening or aperture, a driving member mounted within the opening of the fixed member, a driven member also mounted within the opening in the fixed member and guided by the walls of said aperture, means between the driving and driven members to cause them to rotate together, but permitting relative lateral movement with relation to each other, means carried by the driven member to coöperate with the fixed oppositely inclined surfaces of the fixed member, and a bearing for the driven member comprising a bent body member having a foot and a slotted arm, the body member serving as a stop to limit the outward movement of the driven member, the bent arm of the bearing forming a stop for the inward movement of the driving member.

15. A mechanical movement comprising a fixed member formed of one or more parts and provided with fixed oppositely inclined surfaces and with an opening, a driving member mounted within the opening of the fixed member and provided with a button or handle, a driven member mounted within the opening in the fixed member and guided by the walls of said aperture in said member, means carried by the driven member to coöperate with the fixed oppositely inclined surfaces of the fixed member, means between the driving and driven members to cause them to rotate together, but permitting relative lateral movement with relation to each other, and a bearing comprising a bent plate including a body member having a slotted arm bent at right angles to said body member, the end of the arm being bent down to form a stop for the inward movement of the button or handle, the body member of the bearing forming a stop to the outward movement of the driven member.

16. In an electric light socket the combination of an insulating base, a shell contact, and coöperating relatively movable locking surfaces carried partly by the insulating base and partly by the shell contact to permit the shell contact to be slipped onto the base and be securely held.

17. In an electric light socket the combination of an insulating base provided with a groove, a shell contact provided with a fixed inturned flange adapted to slip into the groove in the base to removably hold the shell to the base.

18. In an electric light socket the combination of an insulating base provided with one or more transverse grooves, a shell contact provided with one or more fixed flanges adapted to coöperate with the transverse groove or grooves in the base, permitting the shell to be secured to the base by sliding it into position.

19. In an electric light socket the combination of a fixed insulating base formed of one or more parts, and provided with oppositely fixed inclined surfaces, a driving member, a driven member, means between the driving and driven members to cause them to rotate together, but permitting relative lateral movement with relation to each other, means carried by the driven member to coöperate with the fixed oppositely inclined surfaces of the fixed member, contacts carried by the fixed member which are adapted to be connected or disconnected by alternate lateral movement of the driven member.

20. In an electric light socket the combination of a fixed insulating member formed of one or more parts having an opening, fixed oppositely inclined surfaces carried by the fixed member, a driving member mounted in the aperture in the fixed member, a driven member mounted on the driving member and adapted to be guided by the walls of the aperture in the fixed member, means between the driving and driven members to cause them to rotate together, but permitting relative lateral movement with relation to each other, contacts carried by the fixed member adapted to be connected or disconnected by the alternate lateral movement of the driven member, and means carried by the driven member adapted to coöperate with the oppositely inclined surfaces of the fixed member.

21. An article of manufacture for an electric light socket comprising a hollow insulating base provided with oppositely inclined surfaces and with one or more locking surfaces.

22. An article of manufacture for an electric light socket comprising a hollow insulating base provided with integral oppositely inclined surfaces and with a second aperture beneath the hollow portion of the base.

23. An article of manufacture for an electric light socket comprising a center contact plate provided with a locking arm having means to coöperate with a locking member, a downwardly extending member bent back upon itself to form a center contact and with an upwardly bent member to form a binding plate.

24. An article of manufacture for an electric light socket comprising an integral one piece hollow base or receptacle provided with oppositely inclined surfaces, and with one or more grooves to hold the screw shell contact.

25. In an electric light socket the combination of a hollow insulating base or receptacle formed of one or more parts and provided with fixed oppositely inclined surfaces, a driving member mounted within the aperture of the fixed insulating member, a driven member mounted on the driving member and adapted to be guided by the walls of the aperture in the fixed insulating member, means between the driving and driven members to cause them to rotate together, but permitting relative lateral movement with relation to each other, means carried by the driven member to coöperate with the oppositely inclined surfaces of the fixed insulating member, separated contacts carried by the fixed member and adapted to be connected and disconnected by the alternate lateral movement of the driven member, and a third contact connected directly to one of the feed wires.

26. In an electric light socket the combination of a fixed insulating member formed of one or more parts and provided with a recess or aperture and with oppositely inclined surfaces and with engaging surfaces to coöperate with surfaces carried by the screw shell contact, a screw shell contact having surfaces to coöperate with those carried by the insulating base or receptacle, a contact connected to the screw shell contact extending up into the aperture of the fixed insulating member, a similar contact mounted within the aperture in the fixed insulating contact and connected to a feed wire, a driving member mounted within the aperture in the fixed insulating member, a driven member mounted on the driving member, means between the driven and driving members to cause them to rotate together, but permitting relative lateral movement with relation to each other, means carried by the driven member to coöperate with the oppositely inclined surfaces of the fixed insulating member, and a center contact connected to the other feed wire.

27. In an electric light socket the combination of a fixed insulating member formed of one or more parts and provided with a recess or aperture and with oppositely inclined surfaces and with surfaces to coöperate with surfaces carried by the screw shell contact, a screw shell contact having surfaces to coöperate with those carried by the insulating base or receptacle, a contact connected to the screw shell contact extending up into the aperture of the fixed insulating member, a similar contact mounted within the aperture in the fixed insulating contact and connected to a feed wire, a driving member mounted within the aperture in the fixed insulating member, a driven member mounted on the driving member, means between the driving and driven members to cause them to rotate together, but permitting relative lateral movement with relation to each other, means carried by the driven member to coöperate with the oppositely inclined surfaces of the fixed insulating member, a center contact connected to the other feed wire, and a bearing for the driving member connected to the insulating fixed member and provided with a slotted arm having one end bent down at an angle, the bent end acting as a stop to the inward movement of the driving member, the body member of the bearing operating as a stop to the outward movement of the driven member.

28. An article of manufacture for an electric light socket comprising an insulating base or receptacle provided with an opening or aperture, and an inwardly extending arm provided with oppositely inclined surfaces extending into the aperture.

29. An article of manufacture for an electric light socket comprising an insulating base or receptacle provided with an opening or aperture and an inwardly extending integral arm provided with oppositely inclined surfaces extending into the aperture.

30. In an electric light socket the combination of an insulating base or receptacle provided with an aperture or opening, oppositely inclined surfaces, a groove or recess to coöperate with surfaces carried by the screw shell contact, and with a second opening or recess for the reception of the center contact plate, a screw shell contact having coöperating surfaces to engage with the groove carried by the insulating base and with a contact which extends up into the main aperture of the fixed insulating base, a driving member mounted within the insulating base, a driven member mounted on the driving member, means between the driving and driven members to cause them to rotate together, but permitting relative lateral movement with relation to each other, another contact mounted within the aperture of the insulating base, spring means carried by the driven member to coöperate with the oppositely inclined surfaces of the fixed insulating member, said driven member being adapted to make or break the electrical connection between the two electrical contacts mounted within the aperture of the insulating base, a center contact plate having a center contact and a binding plate, and a portion mounted within the second aperture of the insulating base or receptacle, and a nut to coöperate with said portion of the said center contact plate to hold it to the insulating base or receptacle.

TONJES AUGUST CARL BOTH.

Witnesses:
  M. Bush,
  Benj. Strauss.

---

Copies of this patent may be obtained for five cents each, by addressing the "Commissioner of Patents, Washington, D. C."